(12) United States Patent
Ota et al.

(10) Patent No.: US 11,898,709 B2
(45) Date of Patent: Feb. 13, 2024

(54) LIGHTING DEVICE

(71) Applicant: Japan Display Inc., Tokyo (JP)

(72) Inventors: Takashi Ota, Tokyo (JP); Nobuyuki Suzuki, Tokyo (JP); Makoto Hasegawa, Tokyo (JP); Masafumi Okada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/099,354

(22) Filed: Jan. 20, 2023

(65) Prior Publication Data

US 2023/0235863 A1    Jul. 27, 2023

(30) Foreign Application Priority Data

Jan. 24, 2022    (JP) .................................. 2022-008346

(51) Int. Cl.
| | | |
|---|---|---|
| *F21K 9/68* | (2016.01) | |
| *F21K 9/69* | (2016.01) | |
| *F21V 7/00* | (2006.01) | |
| *F21V 5/04* | (2006.01) | |
| *G02F 1/1335* | (2006.01) | |
| *F21Y 115/10* | (2016.01) | |

(52) U.S. Cl.
CPC .................. *F21K 9/68* (2016.08); *F21K 9/69* (2016.08); *F21V 5/04* (2013.01); *F21V 7/0066* (2013.01); *F21Y 2115/10* (2016.08); *G02F 1/133526* (2013.01)

(58) Field of Classification Search
CPC ..... F21K 9/68; F21K 9/69; F21V 5/04; F21V 7/0066; F21Y 2115/10; G02F 1/133526
See application file for complete search history.

(56) References Cited

U.S. PATENT DOCUMENTS

| | | |
|---|---|---|
| 2007/0230171 A1 | 10/2007 | Hiratsuka |
| 2014/0028924 A1 | 1/2014 | Yamaguchi et al. |
| 2021/0325024 A1* | 10/2021 | Hasegawa ............. F21V 14/003 |

FOREIGN PATENT DOCUMENTS

| | | | |
|---|---|---|---|
| JP | 2007-073306 A | 3/2007 | |
| JP | 2008-159562 A | 7/2008 | |
| JP | 2012-069409 A | 4/2012 | |
| WO | WO-2011125010 A1 * | 10/2011 | ............... F21K 9/00 |

* cited by examiner

*Primary Examiner* — Elmito Breval
(74) *Attorney, Agent, or Firm* — Michael Best & Friedrich LLP

(57) ABSTRACT

A lighting device including a first unit and a second unit, the first unit including: a first funnel shaped reflector having a first neck, a first opening, a first reflecting surface and a first light axis, a first LED emitting a first color disposed on the first neck, a first liquid crystal lens disposed at the first opening, a second unit including: a second funnel shaped reflector having a second neck, a second opening, a second reflecting surface and a second light axis, a second LED emitting a second color disposed on the second neck, a second liquid crystal lens disposed at the second opening; a length h1 of the first funnel shaped reflector is same as a length of the second funnel shaped reflector, and a diameter d1 of the first opening is same as a diameter of the second opening, and h1/d1 is two or more.

15 Claims, 18 Drawing Sheets

FIG. 8
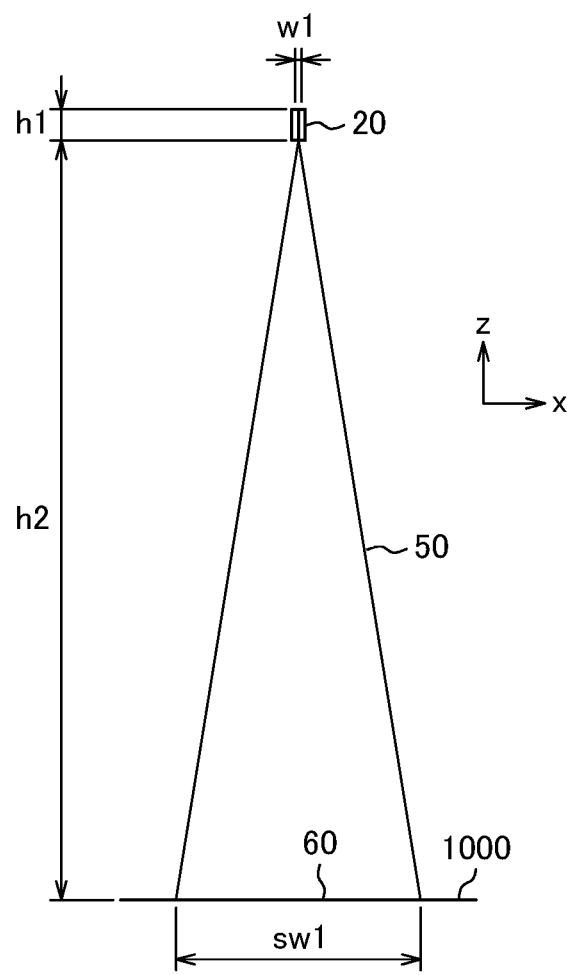
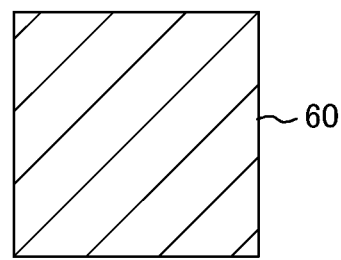

FIG. 10

| Color of spot<br>Color of LED | W | R | G | B | Y | C | P |
|---|---|---|---|---|---|---|---|
| R LED |  | ON |  |  | ON |  | ON |
| G LED |  |  | ON |  | ON | ON |  |
| B LED |  |  |  | ON |  | ON | ON |
| W LED | ON |  |  |  |  |  |  |

W: White   Y: Yellow
R: Red     C: Cyan
G: Green   P: Purple
B: Blue

100:OFF

100:ON

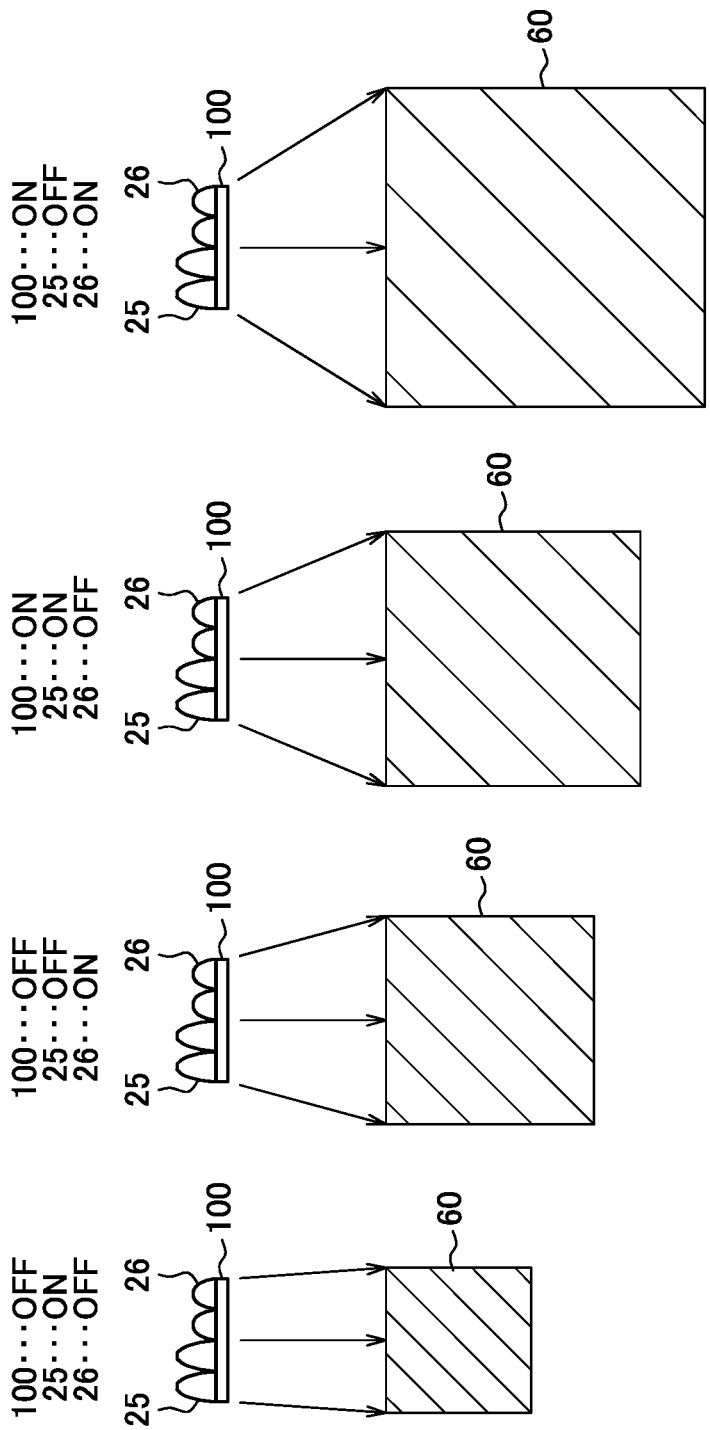

LIGHTING DEVICE

CLAIM OF PRIORITY

The present application claims priority from Japanese Patent Application JP 2022-008346 filed on Jan. 24, 2022, the content of which is hereby incorporated by reference into this application.

BACKGROUND OF THE INVENTION

(1) Field of the Invention

The present invention relates to a lighting device especially to the one which is able to change a size and a color of a light spot easily.

(2) Description of the Related Art

A spot light is needed in a lighting in the studio or as an interior lighting to irradiate pictures and so forth. In such cases, there are needs to change a size of the light spot or a shape of the light spot. In addition, there is a chance that various color spots are needed in addition to white spot.

Patent document 1 discloses a lighting device, which has LEDs as a light source, and in which a first reflecting surface of paraboloid and a second reflecting surface of flat are combined with each other to raise a light utilizing efficiency.

Patent document 2 discloses a structure to acquire a pseud rectangular light spot. The shape of the lighting device is a cap shaped and a plan view of emitting surface is circular. The reflecting plates which are set in an inner wall of the cap shaped lighting device are changed for each inner places of the lighting device Patent document 3 discloses a structure to acquire a pseud rectangular light spot from a lighting device, which is cylinder in outer shape and has a circular shape at light emitting plane in a plan view. Many concave mirrors including lighting sources in them are disposed in the cylinder, and each of the shapes of concave mirrors are changed to acquire a pseud rectangular light spot.

Patent document 4 discloses structures to utilize liquid crystal lenses in several optical devices.

PRIOR TECHNICAL DOCUMENT

Patent Document

Patent document 1: Japanese patent application laid open No. 2007-73306
Patent document 2: Japanese patent application laid open No. 2008-159562
Patent document 3: Japanese patent application laid open No. 2012-069409
Patent document 4: WO 2012/099127

SUMMARY OF THE INVENTION

Prior art documents disclose means to efficiently control a shape of light spot. On the other hand, in addition to white light spot, colored light spots are also required. When color is meant, it includes not only colors but also tones of colors. As to white light, there is a chance that white colors of different color temperatures are required.

The purpose of the present invention is to realize a lighting device, which can efficiently control a shape of light spot, as well as can control tones of various color.

The present invention solves the above explained problems; examples of concrete structures of the present invention are as follows.

(1) A lighting device including a first unit and a second unit, a first unit including: a first funnel shaped reflector having a first neck, a first opening, a first reflecting surface and a first light axis, a first LED emitting a first color being disposed on the first neck, a first liquid crystal lens being disposed at the first opening; a second unit including: a second funnel shaped reflector having a second neck, a second opening, a second reflecting surface and a second light axis, a second LED emitting a second color being disposed on the second neck, a second liquid crystal lens being disposed at the second opening, in which a length h1 of the first funnel shaped reflector along the first light axis is same as a length of the second funnel shaped reflector along the second light axis, a diameter d1 of the first opening of the first funnel shaped reflector is same as a diameter of the second opening of the second funnel shaped reflector, and h1/d1 is two or more.

(2) The lighting device according to (1), the lighting device further including a third unit, the third unit including: a third funnel shaped reflector having a third neck, a third opening, a third reflecting surface and a third light axis, a third LED emitting a third color being disposed on the third neck, a third liquid crystal lens being disposed at the third opening, in which a length of the third funnel shaped reflector along the third light axis is same as a length of the first funnel shaped reflector along the first light axis, and a diameter of the third opening of the third funnel shaped reflector is same as a diameter of the first opening of the first funnel shaped reflector.

(3) The lighting device according to (2), the lighting device further including a fourth unit, the fourth unit including: a fourth funnel shaped reflector having a fourth neck, a fourth opening, a fourth reflecting surface and a fourth light axis, a fourth LED emitting a fourth color being disposed on the fourth neck, a fourth liquid crystal lens being disposed at the fourth opening, in which a length of the fourth funnel shaped reflector along the fourth light axis is same as a length of the first funnel shaped reflector along the first light axis, and a diameter of the fourth opening of the fourth funnel shaped reflector is same as a diameter of the first opening of the first funnel shaped reflector.

(4) The lighting device including a first assembly and a second assembly, a first assembly including: a first funnel shaped reflector having a first neck, a first opening, a first reflecting surface and a first light axis, a first liquid crystal lens being disposed at the first opening, a length of the first funnel shaped reflector along the first light axis being h1 and a diameter of the opening being d1, a first unit including a first LED emitting a first color being disposed on the first neck, a second unit including a second LED emitting a second color being disposed on the first neck, a third unit including a third LED emitting a third color being disposed on the first neck, a fourth unit including a fourth LED emitting a fourth color being disposed on the first neck, a second assembly including: a second funnel shaped reflector having a second neck, a second opening, a second reflecting surface and a second light axis, a second liquid crystal lens being disposed at the second opening, a length of the second funnel shaped reflector along the second light axis being h2 and a diameter of the opening being d2, a fifth unit including a first LED emitting a first color being disposed on the second neck, a sixth unit including a second LED emitting a second color being disposed on the second neck, a seventh unit including a third LED emitting a third color being disposed on the second neck, an eighth unit including a fourth LED emitting a fourth color being disposed on the second neck, in which h1/d1 is two nor more, and h1>h2.

BRIEF DESCRIPTION OF THE DRAWINGS

FIG. 8 shows a model between the lighting device according to embodiment 1 and a light spot;

FIG. 10 is a table to show the effects of embodiment 1;

FIG. 12 is an example of a light spot when the liquid crystal lens is ON;

FIG. 15 shows a light spot when a long rectangle funnel shaped reflector is ON and the liquid crystal lens is OFF.

FIG. 16 shows a light spot when a short rectangle funnel shaped reflector is ON and the liquid crystal lens is OFF.

FIG. 17 shows a light spot when a long rectangle funnel shaped reflector is ON and the liquid crystal lens is ON.

FIG. 18 shows a light spot when a short rectangle funnel shaped reflector is ON and the liquid crystal lens is ON.

DETAILED DESCRIPTION OF THE PREFERRED EMBODIMENTS

Figure 1:
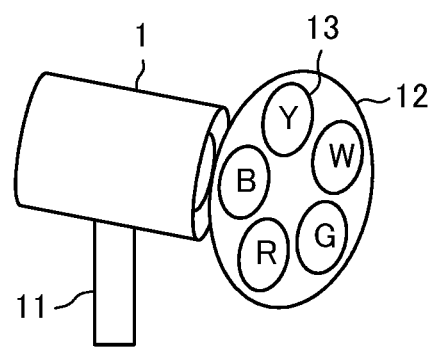
FIG. 1 is a perspective view of a color flood light.

FIG. 1 is a perspective view of a flood light 1 for color light spots. In FIG. 1, a color converter 12, which has a plurality of color films 13, is disposed at an emitting portion of the flood light 1, which has an aim 11. In the color converter 12, Y is a yellow film, B is a blue film, G is a green film, and W is a white film. In the meantime, the white color is used when color temperature is necessary to be controlled or a tone of a color is necessary to be controlled.

Figure 2:
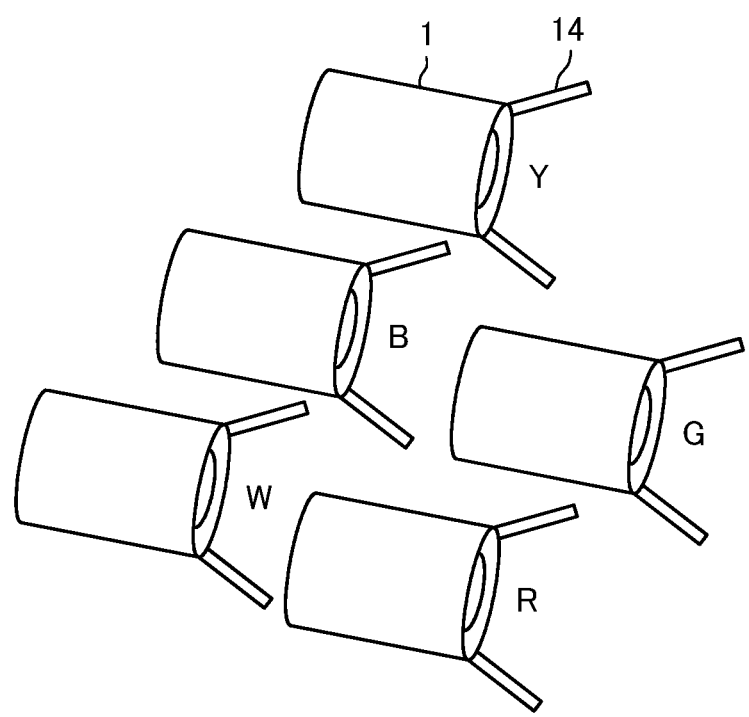
FIG. 2 is a perspective view of a lighting device, in which a plurality of flood lights are disposed to control a color of light spot.

The flood light in FIG. 1 can emit only one color. When light spots of many colors are required, many light floods 1 of FIG. 1 must be provided and need to mix the light from each of the light floods 1. FIG. 2 shows this model. In FIG. 2, five light floods 1 are provided; each of the light flood 1 emits light of yellow, blue, and so forth. Each of the light floods 1 has the same structure as FIG. 1. In FIG. 2, light shading plates 14 are provided at an emitting area of each of the light floods 1.

Many light floods 1 are necessary to obtain a desired size, shape and color of the light spot according to the structure of FIG. 2. In addition, each of the light floods 1 must be controlled individually.

According to the present invention, a light spot of desired size, shape and color can be easily obtained by rather simple structure and by easy operation. The present invention is explained according to the following embodiments.

Embodiment 1

Figure 3:
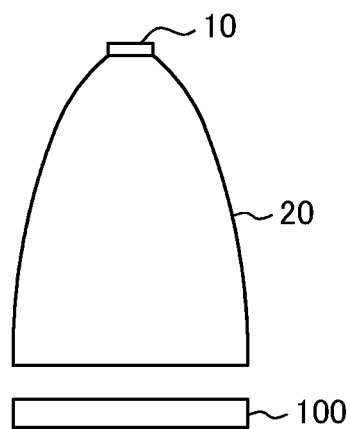
FIG. 3 is a side view of a lighting device according to the present invention.
Figure 4:
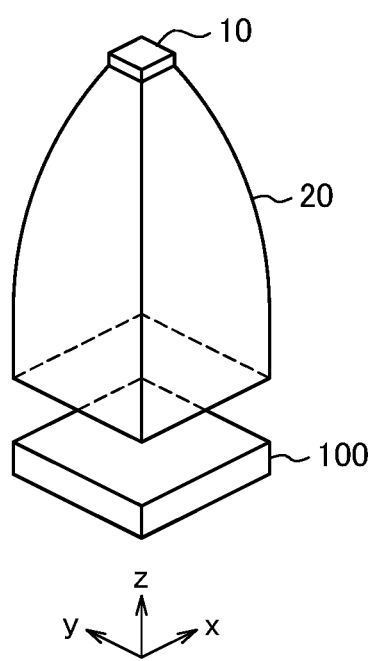
FIG. 4 is a perspective view of the lighting device according to the present invention.

FIG. 3 is a side view of a basic structure of a lighting device according to embodiment 1. In FIG. 3, a liquid crystal lens 100 is disposed at an opening of a bell shaped reflector 20. The opening of the bell shaped reflector 20 is rectangle. FIG. 4 is a perspective view of FIG. 3. The bell shaped reflector as FIG. 4 is called as a rectangle funnel shaped reflector 20, herein after. The "rectangle" is used to distinguish from a bell shaped reflector, which has a circular opening as explained in embodiment 3. When opening is circle, it is called as a circular funnel shaped reflector 30. Although FIG. 4 shows only outer shape of the bell shaped reflector 20, an inside of the bell shaped reflector 2, too, is approximately in a same shape as the outer shape.

The reason why the funnel shaped reflector 20 is used is to make smaller a light distribution angle of the light emitted from the funnel shaped reflector 20. Since at least a part of the funnel shaped reflector 20 is paraboloid, the light is directed parallel to a light axis. In FIG. 4, the light axis is in z direction. Since the funnel shaped reflector 20 has a small light distribution angle, the light spot keeps rectangle.

An LED (Light Emitting Diode) 10 as a light source is disposed at an apex, which is a neck of the funnel shaped reflector 20, as shown in FIGS. 3 and 4. The LED 10 is in a rectangular, each of the sides is approximately 1 mm.

The liquid crystal lens 100 is disposed at an opening of the funnel shaped reflector 20. The liquid crystal lens 100 has a role to change a size or shape of the light spot. Although the liquid crystal lens 100 is used in contact with the opening of the funnel shaped reflector 20, the liquid crystal lens 100 is shown as separated from the funnel shaped reflector 20 for easy perception of the drawing in FIGS. 3 and 4. A combination of the rectangle funnel shaped reflector 20 or the circle funnel shaped reflector 30, with the LED 10 and the liquid crystal lens 100 may be called as a unit, herein after.

In FIGS. 3 and 4, the liquid crystal lens 100 is drawn small in accordance with the opening of the rectangle funnel shaped reflector 20, however, it can be made larger according to a layout of the lighting device. In addition, when a plurality of funnel shaped reflectors 20 are used in side by side, one panel of the liquid crystal lens 100, which can cover each of the funnel shaped reflectors 20, can be disposed in common to the plurality of the funnel shaped reflectors 20.

Although the liquid crystal lens 100 generally includes a two lens structure of a first liquid crystal lens and a second liquid crystal lens, in FIG. 3 and FIG. 4, the liquid crystal lens is shown as one piece for easy perception. However, since a thickness of the liquid crystal lens can be made very thin, the thickness of the liquid crystal lens 100 does not influence so much to the total thickness of the lighting device, any way.

In FIGS. 3 and 4, the liquid crystal lens 100 is disposed at the opening of the rectangle funnel reflector 20. The light incident to the liquid crystal lens 100 is easier to be controlled when it is a parallel light. That is to say, the light of less light distribution is easier to control. The light emitting from the opening or the rectangle funnel shaped reflector 20 has a small light distribution angle, thus, a precise control by the liquid crystal lens 100 can be realized.

Figure 5:
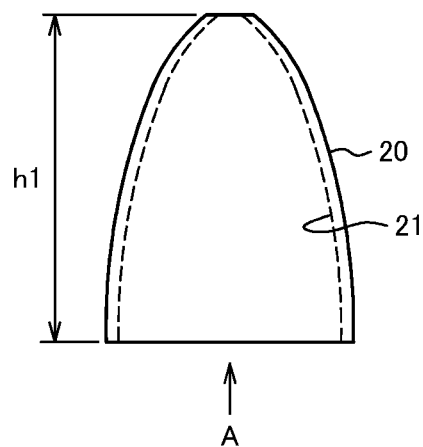
FIG. 5 is a cross sectional view of a rectangle funnel shaped reflector.
Figure 6:
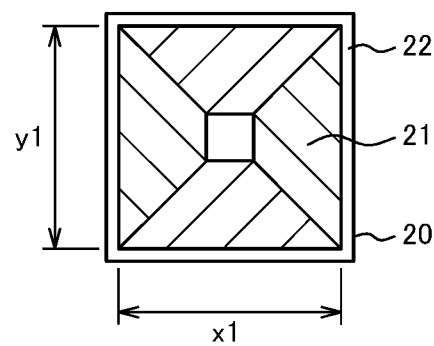
FIG. 6 is a bottom view of the rectangle funnel shaped reflector.

There are several methods to manufacture the rectangle funnel shaped reflector 20. FIG. 5 is a cross sectional view that the rectangle funnel shaped reflector 20 is formed from metal of high reflectance e.g. aluminum by press. FIG. 6 is a bottom view when the rectangular funnel shaped reflector 20 is viewed from A in FIG. 5. In FIG. 5, a height h1 of the rectangle funnel shaped reflector 20 is e.g. 30 mm; lengths x1 and y1 of the opening of the rectangle funnel shaped reflector 20 are e.g. 6.5 mm. Since a size of the rectangle funnel shaped reflector 20 is such small, a thickness of 0.2 mm is enough for the rectangle funnel shaped reflector 20 to maintain a mechanical strength.

An inner surface 21 of the rectangle funnel shaped reflector 20 is a mirror surface, and at least a part of the inner surface is paraboloid to keep the light distribution angle of emitting light small. In FIGS. 5 and 6, the height h1 and the lengths x1 and y1 of the emitting surface have a large influence on light distribution angle. (A length is represented by x1 hereinafter.) A larger value of h1/x1 makes a light distribution angle smaller, which means a smaller light spot. If h1/x1 is too small, it becomes difficult to keep the light spot rectangle. That means it becomes difficult to control a shape of the light spot. Therefore, it is preferable to keep a value of h1/x1 in two or more, preferably three or more, and more preferably four or more. If the opening is rectangle, a value of the long side is a denominator. The funnel shaped reflector 20 as shown in FIG. 5 or FIG. 6 can be foamed by aluminum die-cast as well as press.

Figure 7:
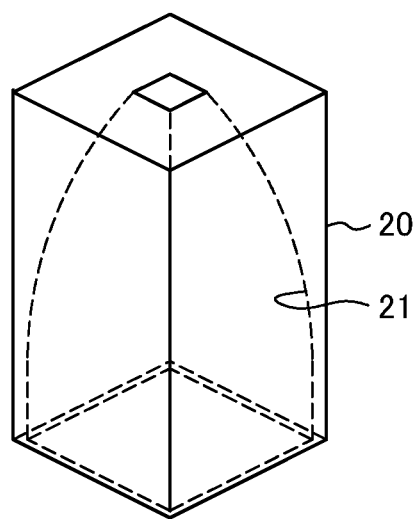
FIG. 7 is a perspective view of another example of the rectangle funnel shaped reflector.

FIG. 7 shows another method to form a rectangle funnel shaped reflector 20, which has a mirror inner surface as shown in FIG. 4. FIG. 7 is the rectangular funnel shaped reflector 20 which is famed by machining a rectangular metal brock having high reflectivity as aluminum so that it can have a reflective surface 21. Since the outer shape of the rectangle funnel shaped reflector 20 in FIG. 7 is rectangular, it is easy to dispose them in line up arrangement. A bottom view of FIG. 7 is the same as FIG. 6.

A shape of FIG. 7 can be foamed by die-cast. A thickness of the funnel shaped reflector 20, however, must be chosen so that it is suitable for manufacturing by die-cast. However, since the funnel shaped reflector 20 is essentially small, as shown in FIG. 8, it gives only little influence on characteristics of the rectangle funnel shaped reflector 20 even when a thickness of it becomes a little bit thicker.

In addition, the shape of FIG. 7 can be realized by resin. That is to say, at first, the outer shape of the funnel shaped reflector 20 is foamed from resin by injection molding, subsequently, the inner surface 21 is coated with metal having high reflectivity as aluminum by sputtering or plating and so forth.

As described in FIGS. 5 and 6, the rectangle funnel shaped reflector 20 is very small, and the lighting device which uses the rectangle funnel shaped reflector 20 is also very small. A distance between the lighting device and an irradiation surface is far larger compared with a size of such lighting devices. FIG. 8 shows a light spot 60 on a floor 1000, which is formed from a lighting structure, in which the two lighting devices as shown in FIG. 3 are disposed side by side, and are set two meters above the floor 1000.

In FIG. 8, 50 is a light flux, 60 is the light spot, and sw1 is a diameter of the light spot. As shown in FIG. 8, the light from the lighting device diverges according to the light distribution angle, and is projected on the floor 1000 as the light spot 60. The shape of the light spot 60 maintains a rectangle according to a rectangle of an opening of the rectangle funnel shaped reflector 20.

In FIG. 8, h1 is a size in z direction of the display device and h2 is a distance between the lighting device and the floor 1000, which is the irradiation surface. In FIG. 8, a distance w1 between the center lines of the two rectangle funnel shaped reflectors 20 is approximately 7 mm. On the other hand, a distance between the lighting device 20 and the floor 1000 is two meters, which is far larger than the distance w1. Therefore, the light spot 60 on the floor 1000 cannot distinguish whether the light source is a right hand side rectangle funnel shaped reflector 20 or a left hand side rectangle funnel shaped reflector 20. That simply means an illuminance becomes two fold when the two rectangle funnel shaped reflectors 20 are lit.

Figure 9:
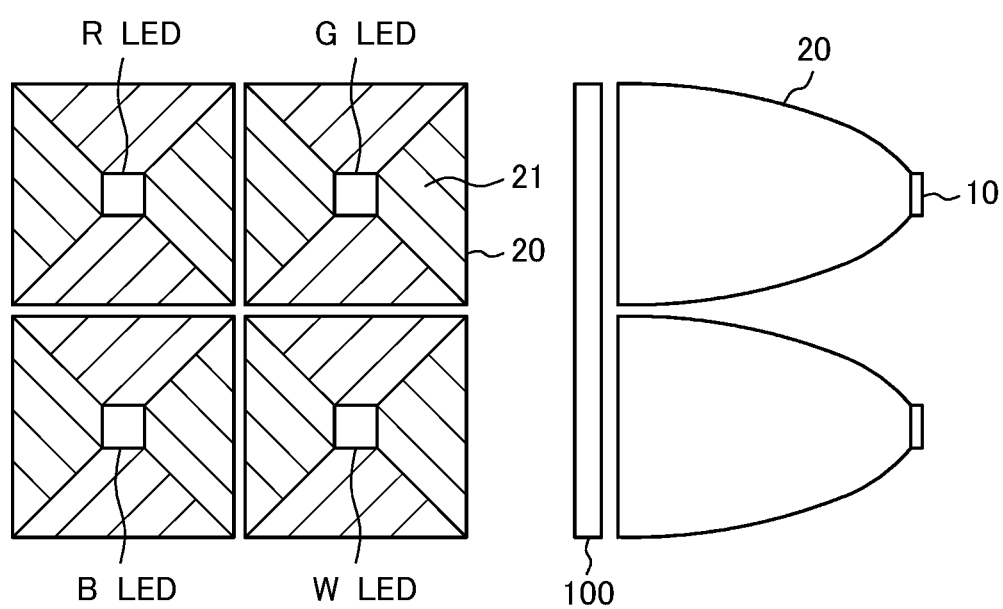
FIG. 9 is a bottom view and a side view of the lighting device according to embodiment 1.

FIG. 9 is a bottom view and a side view, in which the four rectangle funnel shaped reflectors 20 are arranged in square shape. The figure on the left hand side is a bottom view; the size is approximately 14 mm×14 mm even four rectangle funnel shaped reflectors 20 are used. The liquid crystal lens is omitted in the bottom view. Among the four rectangle funnel shaped reflectors 20, "R LED" is a red LED, "G LED" is a green LED, "B LED" is a blue LED and "W LED" is a white LED. In the meantime, the white LED can be used to change a color tone.

The right hand side figure of FIG. 9 is a side view, which corresponds to two units arranged as FIG. 8. The liquid crystal lens 100 is provided at openings of the rectangle funnel shaped reflectors 20. In FIG. 9, the liquid crystal lens panel 100 is provided to cover the four rectangle funnel shaped reflectors 20 in common; however, the liquid crystal lens 100 is formed individually for each of the rectangle funnel shaped reflectors 20.

As explained in FIG. 8, the light spot is famed at the same position and in the same size, no matter which one of the four rectangle funnel shaped reflectors 20 is used. Therefore, a light spot of desired color can be famed by mixing light from four LED light sources of different colors.

Figure 19:
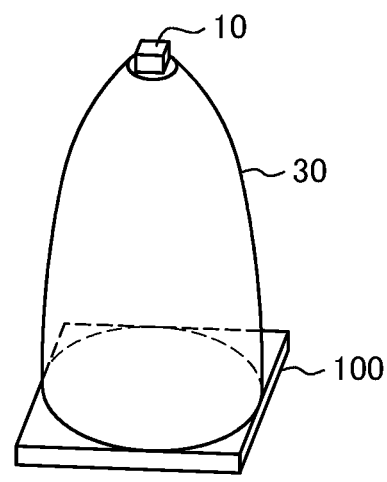
FIG. 19 is a perspective view of a circular funnel shaped reflector.

FIG. 10 is an example of colors of light spots when four LEDs are used. In FIG. 19, any one of the single lighting device can be used when any one of W (white), R (Red), G (Green), or B (Blue) of color light is necessary. R and G are lit for Y (yellow); G and B are lit for C (cyan); R and B are lit for P (purple). Other various intermediate colors can be obtained by arranging light intensities from LEDs of W (white), R (Red), G (Green), or B (Blue).

A size of spot light is determined by light distribution angle which is determined by the rectangle funnel shaped reflector 20 and a distance between the lighting device and the irradiating surface. However, in embodiment 1, since the liquid crystal lens 100 is disposed at the opening of the rectangle funnel shaped reflector 20, a size of the light spot can be controlled by changing a lens action of the liquid crystal lens 100. In other words, a size of the light spot can be controlled by voltage applied to the electrodes of the liquid crystal lens 100.

Figure 11:
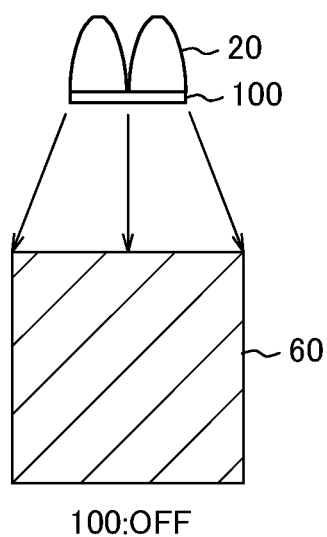
FIG. 11 is an example of a light spot when a liquid crystal lens is OFF.
Figure 12:
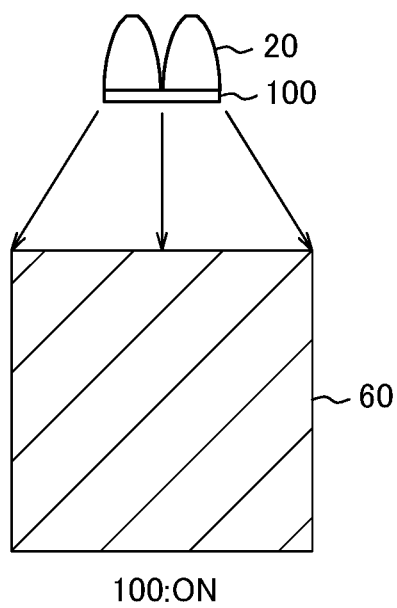

FIGS. 11 and 12 show models in which the light spot 60 is applied by the lighting device of FIG. 9. The liquid crystal lens 100 is disposed at the opening of the rectangle funnel shaped reflector 20 in FIGS. 11 and 12. FIG. 11 shows the light spot 60 when the liquid crystal lens 100 is off; namely, the liquid crystal lens 100 does not influence the light spot shape. FIG. 12 shows when the liquid crystal lens 100 acts as a diverging lens; thus a light spot size in FIG. 12 is larger than a light spot size in FIG. 11. However, the illuminance in FIG. 12 is less than the illuminance in FIG. 11.

In FIGS. 11 and 12, the light spot is uniformly diverged; however, an aspect ratio of the light spot can be changed by controlling voltages applying to the liquid crystal lens 100. The structure and action of the liquid crystal lens 100 are explained in embodiment 4.

FIG. 9 shows the four rectangle funnel shaped reflectors 20 are arranged in square. If raising of illuminance is necessary, the number of the four rectangle funnel shaped reflectors 20 can be increased in every 4 pieces as 12, 16, and so forth. Since a size of the rectangle funnel shaped reflectors 20 is very small such that one side of the bottom is e.g. 6.5 mm, a size is only approximately 26 mm even four rectangle funnel shaped reflectors 20 are arranged in line; therefore, as explained in FIG. 8, the position of the light spot 60 is not essentially changed no matter which rectangle funnel shaped reflector 20 is lit when a distance between the lighting device and the irradiating surface is e.g. two meter.

Therefore, color, shape and size of the light spot 60 can be controlled easily according to the structure of embodiment 1. In the meantime, in the above explanation, the lighting device has four lighting units, each emits light of different color; however, the lighting device can have two lighting units, each emits light of different color, or three lighting units, each emits light of different color, according to necessity.

Embodiment 2

A shape of the light spot can be controlled by a shape of the rectangle funnel shaped reflector 20. A light distribution angle of the light emitted from the rectangle funnel shaped reflector 20 is approximately controlled by a height h1 of the rectangle funnel shaped reflector 20 and a diameter x1 of the side of the opening. According to a value of h1/x1 becomes larger, the light distribution angle becomes smaller; namely, a diameter of the light spot becomes smaller.

Figure 13:
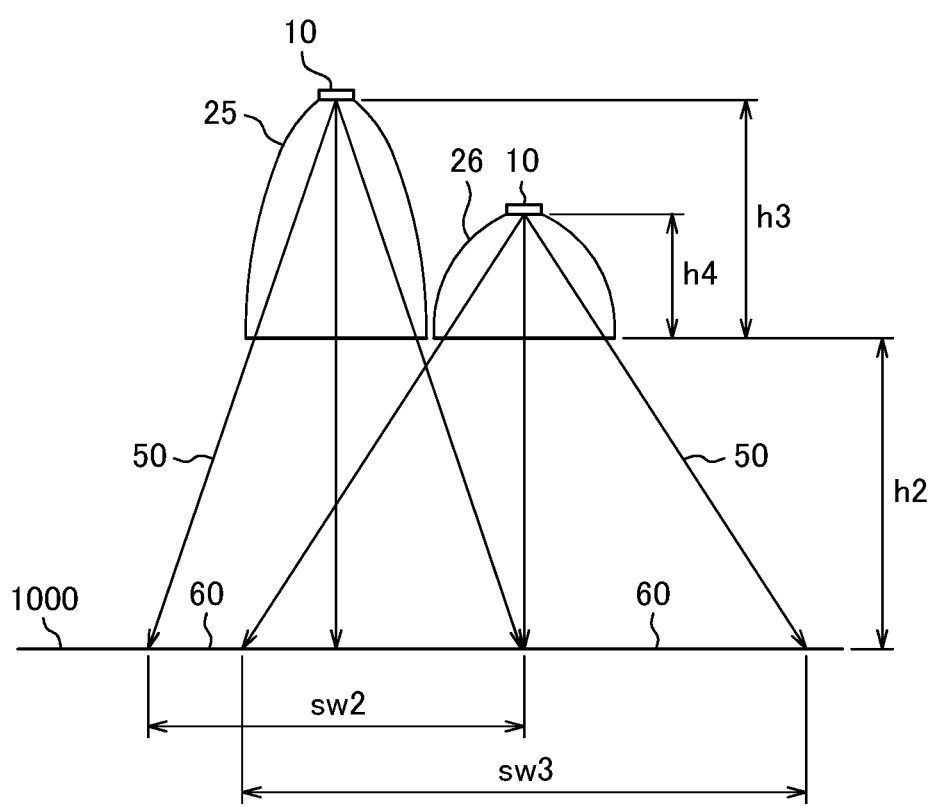
FIG. 13 shows a relation between a length of the rectangle funnel shaped reflector along the light axis and a diameter of the light spot according to embodiment 2.

FIG. 13 shows a model which shows this situation. A high rectangle funnel shaped reflector 25 (height is h3) and a short rectangle funnel shaped reflector 26 (height is h4), both of them have approximately a same opening size, are arranged in side by side. A diameter sw2 of the light spot 60 from the high rectangle funnel shaped reflector 25 is smaller than a diameter sw3 of the light spot 60 from the short rectangle funnel shaped reflector 26.

Figure 14:
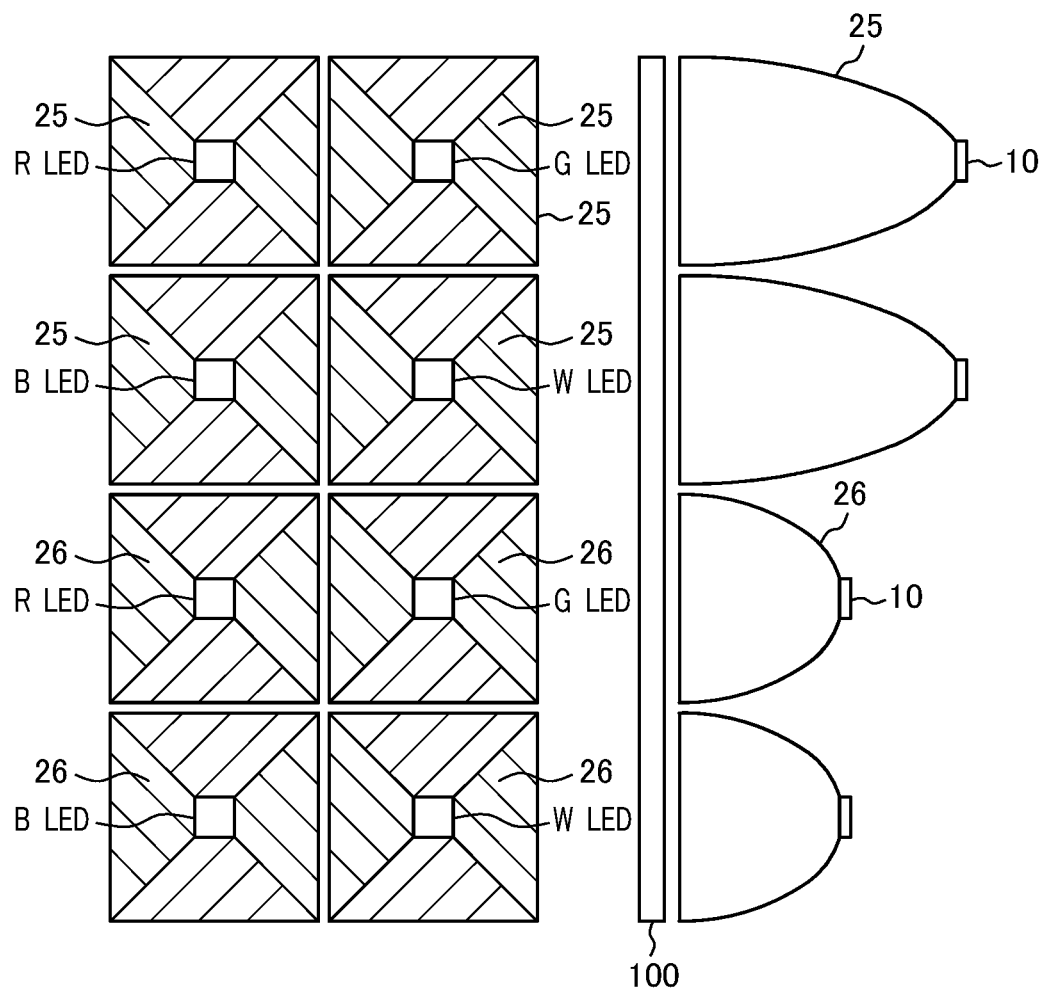
FIG. 14 is a bottom view and a side view of the lighting device according to embodiment 2.

In FIG. 14, a four lighting units, in which a red LED, a blue LED, a green LED and a white LED are combined with the high rectangle funnel shaped reflectors 25, and another lighting units, in which a red LED, a blue LED, a green LED and a white LED are combined with the short rectangle funnel shaped reflectors 26, arranged in side by side; the left hand side is a bottom view and the right hand side is a side view. The liquid crystal lens panel 100, which can form a liquid crystal lens for each of the rectangle funnel shaped reflectors 20, is disposed at openings of the rectangle funnel shaped reflectors 25 and 26. However, the liquid crystal lens 100 is omitted in a bottom view in the left hand side.

In FIG. 14, a small light spot is foiled when the high rectangle funnel shaped reflectors 25 is ON; a large light spot is famed when the short rectangle funnel shaped reflectors 26 is ON. However, as explained in FIG. 8, since a distance between the lighting units is far smaller compared with a distance between the lighting unit and the irradiating surface, a position of the irradiation light spot is not essentially changed.

FIG. 15 through 18 show models which show effects of embodiment 2. In FIGS. 15 through 18, the liquid crystal lens 100 is disposed at the opening of each of the rectangle funnel shaped reflectors 25 and 26. FIG. 15 shows the light spot 60 when only the long rectangle funnel shaped reflectors 25 are lit in the lighting device as FIG. 14. In this case, a rather smaller light spot 60 is formed. The liquid crystal lens 100 is in off state in FIG. 15.

FIG. 16 shows the light spot 60 when only the short rectangle funnel shaped reflectors 26 are lit in a lighting device as FIG. 14. In this case, a rather larger light spot 60 than that in FIG. 15 is formed. The liquid crystal lens 100 is in off state in FIG. 16. FIG. 17 shows a model when the liquid crystal lens 100 acts as a diverging lens in the structure of FIG. 15; therefore, a size of the lighting spot 60 becomes larger than the lighting spot of FIG. 15. FIG. 18 shows a model when the liquid crystal lens 100 acts as a diverging lens in the structure of FIG. 16; therefore, a size of the lighting spot 60 becomes larger than the lighting spot of FIG. 16.

As explained in FIG. 8, a position of the light spot 60 in each of the cases is not essentially changed; only sizes of the light spots 60 are changed. As described above, a size of the light spot 60 can be finely controlled according to the structure of FIG. 14. In the explanation above, two kinds of heights of the rectangle funnel shaped reflectors 25 and 26 are used; however, if three kinds or more of heights of the rectangle funnel shaped reflectors 25 and 26 are used, finer control of the size of the light spot 60 can be possible. In this case, too, the four rectangle funnel shaped reflectors 20 are necessary for each of the height of the rectangle funnel shaped reflectors 20; namely, the number of the rectangle funnel shaped reflectors 20 is multiples of four. In the meantime, if a wide range of color control is not necessary, the number of the rectangle funnel shaped reflectors 20, for each of the height of the rectangle funnel shaped reflectors 20, can be multiples of two or more.

Embodiment 3

The rectangle funnel shaped reflector 20 is used for a small light distribution angle and a rectangle light spot in embodiments 1 and 2. The present invention can be applied not only to the rectangle light spot but also to a circular light spot. FIG. 19 is a perspective view of a circular funnel shaped reflector 30, in which at least a part of inner surface, which is a reflective surface, is paraboloid, and an opening is circle for the circular light spot. In FIG. 19, the LED 10 is disposed on a neck, which is an apex of the circular funnel shaped reflector 30. The liquid crystal lens 100 is disposed at the opening of the circular funnel shaped reflector 30. The structure of FIG. 19 differs from the structures of FIGS. 3 through 6 of embodiment 1 in that the opening of the funnel shaped reflector 20 is circular.

Figure 20:
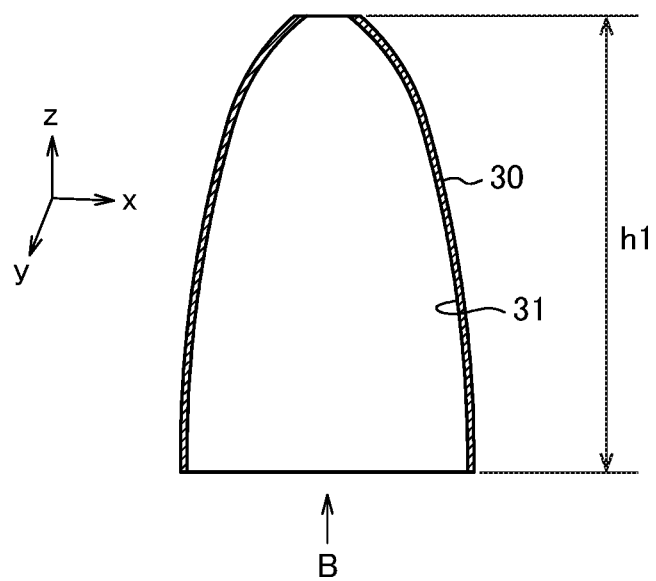
FIG. 20 is an example of a cross sectional view of the circular funnel shaped reflector.
Figure 21:
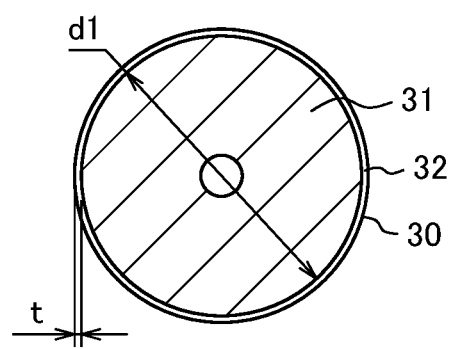
FIG. 21 is a bottom view of FIG. 20.

FIG. 20 is a cross sectional view along the z axis, which is a light axis of the circular funnel shaped reflector 30; FIG. 21 is a bottom view of FIG. 20 which is seen from B direction. A height h1 of the circular funnel shaped reflector 30 is e.g. 30 mm; a diameter d1 of the opening is e.g. 6.5 mm. At least a part of the reflective surface 31 of FIGS. 20 and 21 is paraboloid. A light distribution angle can be kept 10 degrees or less according to such circular funnel shaped reflector 30. It is necessary to set a value of h1/d1 as two or more, preferably three or more, and more preferably four or more.

The circular funnel shaped reflector 30 as shown in FIGS. 20 and 21 can be famed from a metal of high reflectivity as e.g. aluminum by press. Since a size of the circular funnel shaped reflector 30 is very small, a mechanical strength can be kept even a thickness is approximately 0.2 mm.

The circular funnel shaped reflector 30 as shown in FIGS. 20 and 21 can also be famed by aluminum die-cast. In this case, a thickness t is chosen suitable for the die-cast; since outer size of the circular funnel shaped reflector 30 is essentially small, a thickness of the circular funnel shaped reflector 30 does not make a big problem as explained in FIG. 8.

Figure 22:
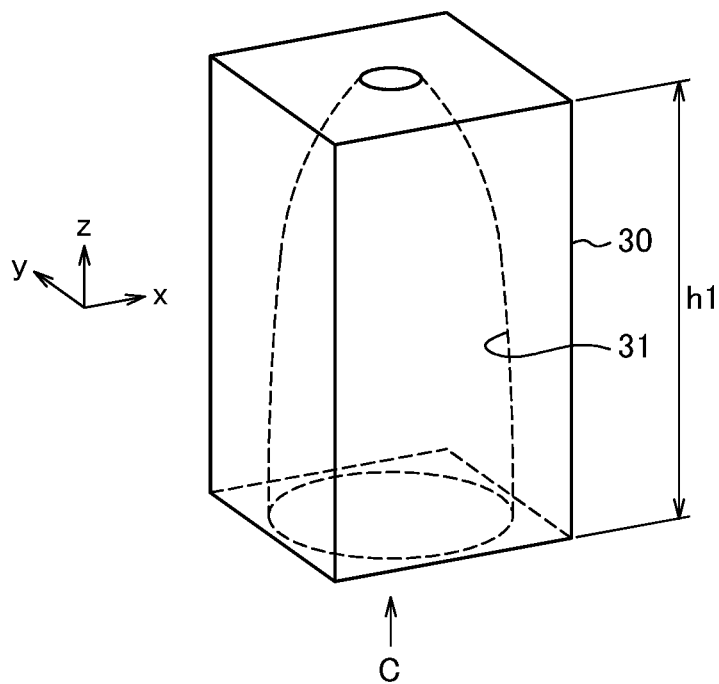
FIG. 22 is a perspective view of another example of the circular funnel shaped reflector.
Figure 23:
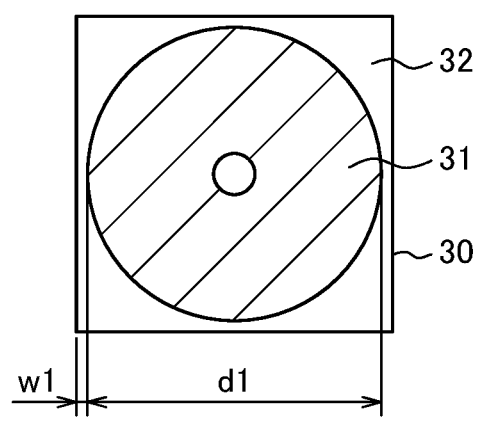
FIG. 23 is a bottom view of FIG. 22.
Figure 24:
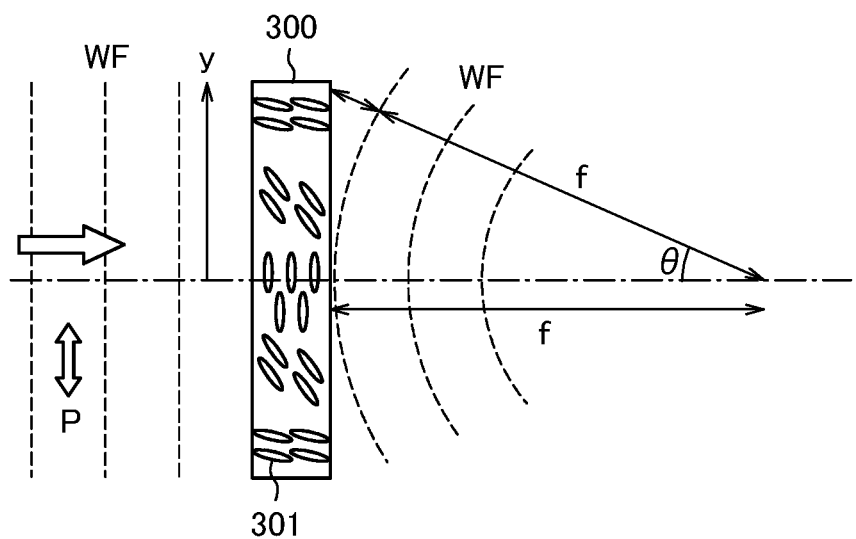
FIG. 24 is an example that a convex lens is formed by the liquid crystal lens.

FIGS. 22 and 23 show another manufacturing method of the circular funnel shaped reflector 30. FIG. 23 is a perspective view, and FIG. 24 is a bottom view when FIG. 23 is viewed from C direction. In FIG. 22, a block of metal, which has high reflectivity as aluminum, is machined so that at least a part of the recess 31 of the inner surface 31 is made paraboloid. Since a cross section of the recess normal to the z axis is circle in the structure of FIG. 22, machining is easier compared with machining of the rectangle funnel shaped reflector 20.

The circular funnel shaped reflector 30 of FIGS. 22 and 23 can be formed by resin. The structure of FIG. 22 is made by injection molding; subsequently, metal, as e.g. aluminum, having high reflectivity is coated on the inner surface 31 by sputtering or plating, and so forth.

A lighting device, which can project a circular light spot, can be realized by the structure of FIG. 19 using the circular funnel shaped reflector 30 shown in FIGS. 20 and 21 or FIGS. 22 and 23. That is to say, the effect explained in embodiments 1 and 2 can be realized by substituting the rectangle funnel shaped reflector 20 by the circular the rectangle funnel shaped reflector 30. The difference in embodiment 3 is that the light spot is circle.

In the meantime, a lighting device that can change a light spot from a circular light spot to a rectangle light spot or vice versa can be realized by juxtaposing the rectangle funnel shaped reflector 20 and the circular funnel shaped reflector 30. In the above example in embodiment 3, the opening of the funnel shaped reflector 30 is circle, however, the opening can be ellipse. In this case, a long axis of the ellipse is used as a ratio of h1/d1, in which a height of the funnel shaped reflector is h1 and a diameter of the opening is d1.

Embodiment 4

Embodiment 4 shows examples of the liquid crystal lens 100 used in embodiment 1 through embodiment 3. FIG. 24 is a cross sectional view which shows function of the liquid crystal lens 100. In FIG. 24, collimated light enters a liquid crystal layer 300 from the left hand side. P in FIG. 24 means a polarized direction of impinging light. Generally, the polarized direction of normal light distributes randomly, however, the liquid crystal has an anisotropy in refraction; therefore, FIG. 24 shows a function of the liquid crystal layer 300 to the light polarized in P direction.

In FIG. 24, liquid crystal molecules 301 align as that a tilting angle becomes larger in going to periphery of the liquid crystal layer 300 due to electrical field from the electrodes. The liquid crystal molecule 301 has an elongated shape; effective refractive index in the long axis is larger than effective refractive index in the short axis in the liquid crystal molecule 301; therefore, refractive index in the liquid crystal layer 300 becomes larger in going to periphery, thus, a convex lens is formed. In FIG. 24, the broken line is a light wave front, and f is a focus distance.

Figure 25:
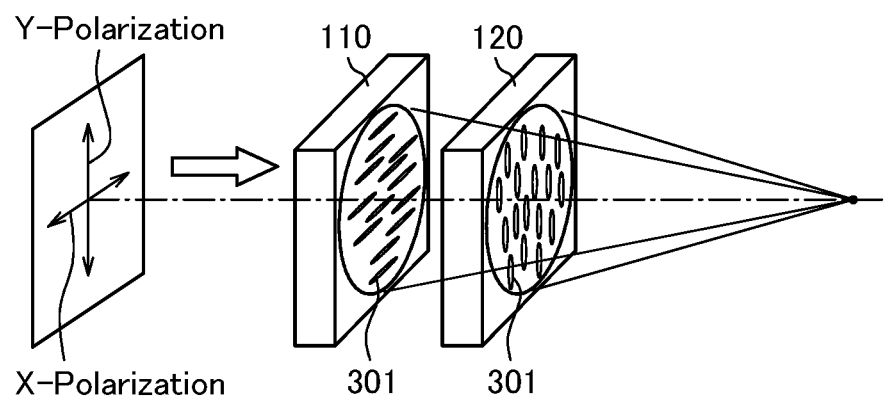
FIG. 25 is a perspective view of a lens system in which the two liquid crystal lenses are used.

The liquid crystal has refractive index anisotropy; therefore, a second lens, which works on the light polarized in orthogonal direction to the polarized direction of light on which the first lens works, is necessary. FIG. 25 is an exploded perspective view of this lens structure. In FIG. 25, the parallelogram in the left hand side is the wave front of light. In FIG. 35, the light polarized in x direction and the light polarized in y direction enters the liquid crystal layer 300. The first liquid crystal lens 110 works on the light polarized in x direction; the second liquid crystal lens 120 works on the light polarized in y direction.

In FIG. 25, initial alignment directions of the liquid crystal molecules 301 are orthogonal between in the first liquid crystal lens 110 and the second liquid crystal lens 120. The initial alignment direction of the liquid crystal molecule 301 is determined by alignment direction of the alignment film formed in the liquid crystal lens. That is to say, in FIG. 25, the alignment directions of the alignment films of the substrates on the side from which the light enters from outside in the two liquid crystal lenses, are orthogonal to each other between the two liquid crystal lenses.

Figure 26:
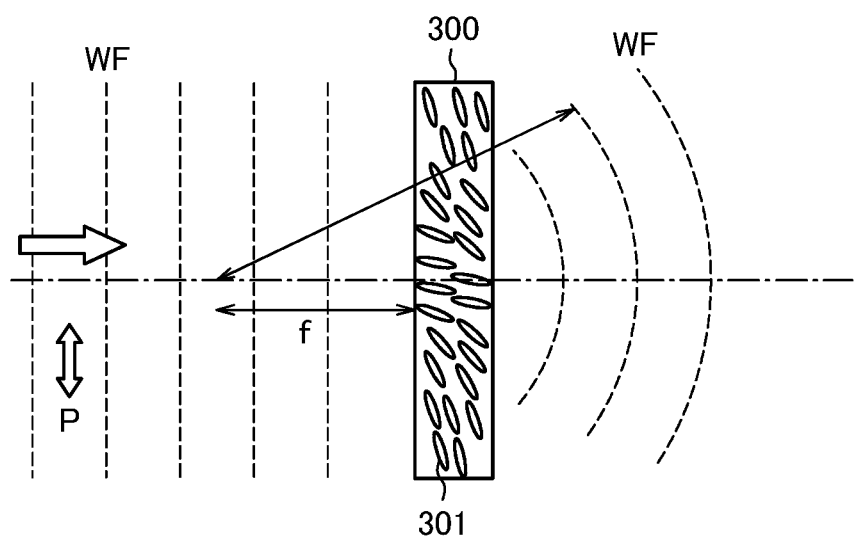
FIG. 26 is an example that a concave lens is foamed by the liquid crystal lens.

FIG. 26 shows how to form a concave lens by the liquid crystal lens. In FIG. 26, the light having the wave front WF, which is parallel to the liquid crystal layer 300, and polarized in one direction enters the liquid crystal layer 300 from the left hand side. In FIG. 26, the liquid crystal molecules 301 align as that the tilting angle becomes smaller in going to periphery of the liquid crystal layer 300 due to electrical field from the electrodes. Due to the above lens structure, the wave front WF of light, which has passed through the liquid crystal layer 300, becomes a curve as shown by broken line in FIG. 26, thus, concave lens is formed. In the meantime, in the case of concave lens also, the two liquid crystal lenses are necessary as explained in FIG. 25.

Figure 27:
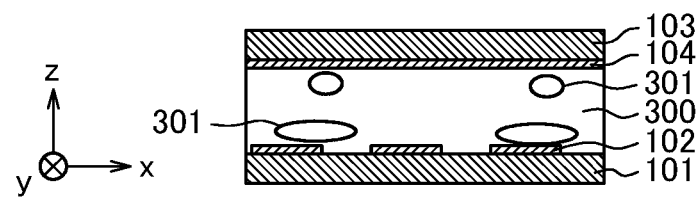
FIG. 27 is a cross sectional view of the liquid crystal lens according to a first example.

FIG. 27 is a cross sectional view of a first example of actual structure of the liquid crystal lens 100. In FIG. 27, the first electrode 102 is formed on the first substrate 101, the second electrode 104 is formed on the second substrate 103, and the liquid crystal layer 300 is sandwiched between the first substrate 101 and the second substrate 103. Alignment films are famed over the first electrode 102 and the second electrode 104; however, alignment films are omitted in FIG. 27. It is the same in other figures. The initial alignment directions of the liquid crystal molecules 301 are determined by alignment treatment, as rubbing process and the like, to the alignment film.

In FIG. 27, the initial alignment direction of the liquid crystal molecules 301 on the first substrate 101 side and the initial alignment direction of the liquid crystal molecules 301 on the second substrate 103 are orthogonal to each other, namely, it is a so called TN (Twisted Nematic) type liquid crystal lens. The first electrode 102 extends in x direction and the second electrode 104 extends in y direction. However, forming the liquid crystal lens 100 in the present invention is not limited to TN type liquid crystal.

Figure 28:
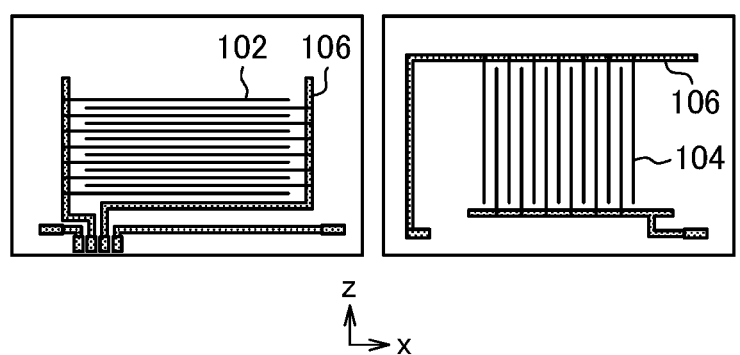
FIG. 28 is a plan views of the first electrodes and the second electrodes according to a first example.

The figure on the left hand side of FIG. 28 is a plan view of the first electrode 102 famed on the first substrate 101. The figure on the right hand side of FIG. 28 is a plan view of the second electrode 104 formed on the second substrate 103. The first electrodes 102 extend in x direction; the second electrodes 104 extend in y direction. The liquid crystal molecules 301 align according to voltage at a cross point of the first electrode 102 and the second electrode 104. That is to say, various functions of the liquid crystal lens can be performed by voltages applied to the first electrode 102 and the second electrode 104

Figure 29:
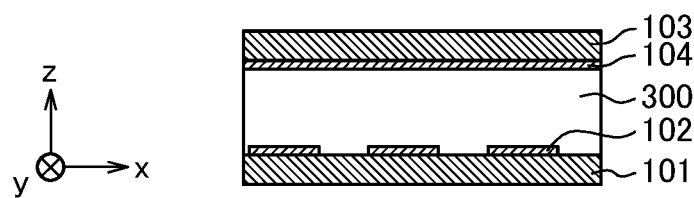
FIG. 29 is a cross sectional view of the liquid crystal lens according to a second example.

FIG. 29 is a cross sectional view of a second example of actual structure of the liquid crystal lens 100. In FIG. 29, the first electrode 102 of stripe is famed on the first substrate 101, the second electrode 104 of stripe is famed on the second substrate 103, and the liquid crystal layer 300 is sandwiched between the first substrate 101 and the second substrate 103.

Figure 30:
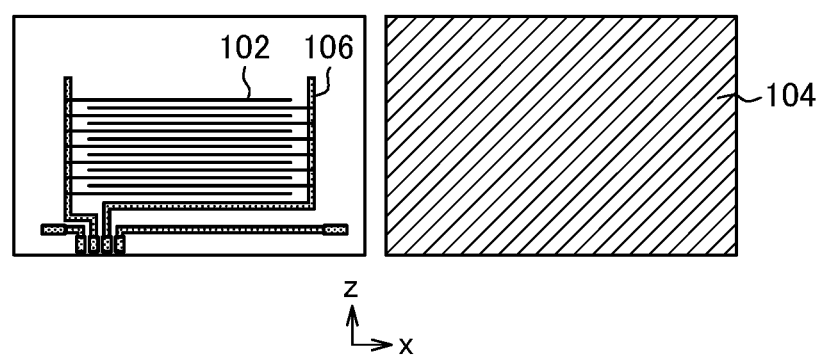
FIG. 30 is a plan views of the first electrodes and the second electrodes according to a second example.

The figure on the left hand side of FIG. 30 is a plan view of the first electrode 102 famed on the first substrate 101; the first electrode extends in x direction. The figure on the right hand side of FIG. 30 is a plan view of the second electrode 104 formed on the second substrate 103; the second electrode 104 is plane shaped. Second example also, as first example, various functions of the liquid crystal lens can be performed by voltages applied to the first electrode 102 and the second electrode 104.

The above explained structures of the liquid crystal lens 100 are examples; the liquid crystal lens can be realized by other structures. When the light spot is controlled by the liquid crystal lens, finer control can be performed if light distribution angle of the light incident to the lens is small. In embodiments 1 through 3, the liquid crystal lens 100 is used in combination with the rectangle funnel shaped reflector 20 shown in FIGS. 5 and 6 or the circular funnel shaped reflector 30 shown in FIGS. 20 and 21. Since both the rectangle funnel shaped reflector 20 and the circular funnel shaped reflector 30 can provide an incident light of small light distribution angle, a fine control in a shape of light spot and a fine control in an illumination distribution can be realized according to the present invention.

What is claimed is:

1. A lighting device comprising a first unit and a second unit,
a first unit including:
a first funnel shaped reflector having a first neck, a first opening, a first reflecting surface and a first light axis,
a first LED emitting a first color being disposed on the first neck,
a first liquid crystal lens being disposed at the first opening,
a second unit including:
a second funnel shaped reflector having a second neck, a second opening, a second reflecting surface and a second light axis,
a second LED emitting a second color being disposed on the second neck,
a second liquid crystal lens being disposed at the second opening,
wherein a length h1 of the first funnel shaped reflector along the first light axis is same as a length of the second funnel shaped reflector along the second light axis,
a diameter d1 of the first opening of the first funnel shaped reflector is same as a diameter of the second opening of the second funnel shaped reflector,
h1/d1 is two or more,
a first collimated light from the first funnel shaped reflector enters the first liquid crystal lens, and
a second collimated light from the second funnel shaped reflector enters the second liquid crystal lens.

2. The lighting device according to claim 1,
the lighting device further including a third unit,
the third unit including:
a third funnel shaped reflector having a third neck, a third opening, a third reflecting surface and a third light axis,
a third LED emitting a third color being disposed on the third neck,
a third liquid crystal lens being disposed at the third opening,
wherein a length of the third funnel shaped reflector along the third light axis is same as a length of the first funnel shaped reflector along the first light axis, and
a diameter of the third opening of the third funnel shaped reflector is same as a diameter of the first opening of the first funnel shaped reflector.

3. The lighting device according to claim 2,
the lighting device further including a fourth unit,
the fourth unit including:
a fourth funnel shaped reflector having a fourth neck, a fourth opening, a fourth reflecting surface and a fourth light axis,
a fourth LED emitting a fourth color being disposed on the fourth neck,
a fourth liquid crystal lens being disposed at the fourth opening,
wherein a length of the fourth funnel shaped reflector along the fourth light axis is same as a length of the first funnel shaped reflector along the first light axis, and
a diameter of the fourth opening of the fourth funnel shaped reflector is same as a diameter of the first opening of the first funnel shaped reflector.

4. The lighting device according to claim 3,
wherein the first color is red, the second color is green, the third color is blue, and the fourth color is white.

5. A lighting device according to claim 3,
wherein, the first opening, the second opening, the third opening and the fourth opening are rectangle.

6. The lighting device according to claim 5,
wherein the first opening, the second opening, the third opening and the fourth opening are rectangle, and a length of a long axis of the rectangle is a diameter d1 of the first opening of the first funnel shaped reflector.

7. The lighting device according to claim 3,
wherein the first opening, the second opening, the third opening and the fourth opening are circle, and d1 is a diameter of the circle.

8. The lighting device according to claim 3,
wherein at least a part of the first reflecting surface, at least a part of the second reflecting surface, at least a part of the third reflecting surface and at least a part of the fourth reflecting surface are paraboloid.

9. The lighting device according to claim 1,
wherein h1/d1 is three or more.

10. A lighting device comprising a first assembly and a second assembly,
a first assembly including:
a first funnel shaped reflector having a first neck, a first opening, a first reflecting surface and a first light axis,
a first liquid crystal lens being disposed at the first opening,
a length of the first funnel shaped reflector along the first light axis being h1 and a diameter of the opening being d1, a first unit including a first LED emitting a first color being disposed on the first neck,
a second unit including a second LED emitting a second color being disposed on the first neck,
a third unit including a third LED emitting a third color being disposed on the first neck,
a fourth unit including a fourth LED emitting a fourth color being disposed on the first neck,
a second assembly including:
a second funnel shaped reflector having a second neck, a second opening, a second reflecting surface and a second light axis,
a second liquid crystal lens being disposed at the second opening,
a length of the second funnel shaped reflector along the second light axis being h2 and a diameter of the opening being d2,
a fifth unit including a first LED emitting a first color being disposed on the second neck,
a sixth unit including a second LED emitting a second color being disposed on the second neck,
a seventh unit including a third LED emitting a third color being disposed on the second neck,
an eighth unit including a fourth LED, emitting a fourth color, disposed on the second neck,
wherein h1/d1 is two or more, and h1>h2, and
a collimated light from the first funnel shaped reflector enters the first liquid crystal lens.

11. The lighting device according to claim 10, wherein h1/d1 is three or more and h2/d2 is two or more, and
a diameter of the first opening and a diameter of the second opening are essentially same.

12. The lighting device according to claim 10, wherein the first opening and the second opening are rectangle.

13. The lighting device according to claim 10, wherein the first opening and the second opening are rectangle and d1 is a length of a long axis of the rectangle.

14. The lighting device according to claim 10, wherein the first opening and the second opening are circle and d1 is a diameter of the circle.

15. The lighting device according to claim 10, wherein at least a part of the first reflecting surface and at least of part of the second reflecting surface are paraboloid.

* * * * *